(12) United States Patent
Nemoto

(10) Patent No.: US 9,525,359 B2
(45) Date of Patent: Dec. 20, 2016

(54) SWITCHING POWER SUPPLY APPARATUS AND IMAGE FORMING APPARATUS

(75) Inventor: Kenji Nemoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 332 days.

(21) Appl. No.: 13/306,658

(22) Filed: Nov. 29, 2011

(65) Prior Publication Data

US 2012/0140530 A1 Jun. 7, 2012

(30) Foreign Application Priority Data

Dec. 6, 2010 (JP) ................................ 2010-271694

(51) Int. Cl.
| | | |
|---|---|---|
| *H02M 3/335* | (2006.01) | |
| *H02M 3/338* | (2006.01) | |
| *H02M 1/00* | (2006.01) | |

(52) U.S. Cl.
CPC ... *H02M 3/3385* (2013.01); *H02M 2001/0032* (2013.01); *Y02B 70/16* (2013.01)

(58) Field of Classification Search
CPC ................. H02M 3/3385; H02M 2001/0032; Y02B 70/16
USPC ............. 363/18–19, 21.04, 21.15–21.16, 97, 49,363/29, 21.01–21.12; 323/901; 347/192; 399/37, 88
See application file for complete search history.

(56) References Cited

U.S. PATENT DOCUMENTS

| | | | | |
|---|---|---|---|---|
| 4,763,235 | A * | 8/1988 | Morita | 363/19 |
| 5,012,399 | A * | 4/1991 | Takemura et al. | 363/18 |
| 6,038,143 | A * | 3/2000 | Miyazaki et al. | 363/19 |
| 6,178,100 | B1 * | 1/2001 | Kitano | 363/19 |
| 6,185,112 | B1 * | 2/2001 | Nishida et al. | 363/19 |
| 6,229,681 | B1 * | 5/2001 | Lee | 361/92 |
| 6,285,566 | B1 * | 9/2001 | Nakahira et al. | 363/19 |
| 6,295,211 | B1 * | 9/2001 | Nishida et al. | 363/19 |
| 6,525,948 | B2 * | 2/2003 | Hsu | 363/56.11 |
| 6,529,392 | B2 * | 3/2003 | Nishida et al. | 363/21.16 |
| 6,532,159 | B2 * | 3/2003 | Nishida et al. | 363/21.16 |
| 6,552,623 | B2 * | 4/2003 | Nishida et al. | 331/111 |
| 6,577,511 | B2 * | 6/2003 | Yamaguchi et al. | 363/21.07 |
| 6,898,090 | B2 * | 5/2005 | Nishida et al. | 363/19 |
| 7,433,208 | B2 * | 10/2008 | Nishida et al. | 363/19 |
| 8,358,517 | B2 * | 1/2013 | Chiang | 363/21.12 |
| 2004/0109334 | A1 * | 6/2004 | Murakami | 363/49 |
| 2005/0024895 | A1 * | 2/2005 | Mabanta et al. | 363/18 |

FOREIGN PATENT DOCUMENTS

JP 2000-278946 A 10/2000

* cited by examiner

*Primary Examiner* — Jessica Han
*Assistant Examiner* — Ivan Laboy Andino
(74) *Attorney, Agent, or Firm* — Canon U.S.A., Inc. IP Division

(57) ABSTRACT

A switching power supply apparatus includes a voltage holding unit which holds voltage generated in an auxiliary winding of a transformer, and a voltage detecting unit which detects voltage applied to the first switching unit. When the first switching unit operates such that voltage generated in a secondary winding of the transformer may be low, voltage is supplied from the voltage holding unit to the first switching unit in accordance with the voltage detected by the voltage detecting unit to thus turn on the first switching unit.

12 Claims, 8 Drawing Sheets

SWITCHING POWER SUPPLY APPARATUS AND IMAGE FORMING APPARATUS

BACKGROUND OF THE INVENTION

Field of the Invention

The present invention relates to self-excited flyback switching power supply apparatuses.

Description of the Related Art

A self-excited flyback switching power supply has been known from the past as a low-voltage power supply for an electronic apparatus. FIG. 5 is a basic circuit diagram of a self-excited flyback switching power supply. Referring to FIG. 5, the switching power supply includes a commercial alternating current (AC) source 400, a filter circuit 401, a rectifier circuit 402, and a primary electrolytic capacitor 403. The AC voltage input from the commercial AC source 400 passes through the filter circuit 401 and is converted to direct current (DC) voltage by the rectifier circuit 402 and smoothing capacitor 403. The power supply further includes a transformer 419, a primary winding Np of the transformer 419, a starting resistance 406, an auxiliary winding Nb wound around the primary side of the transformer 419, a first switching element 405, and a resistance 407 provided between a gate and a source of the first switching element 405. The primary winding Np of the transformer 419 and the switching element 405 are connected in series. The starting resistance 406 is connected to between a positive terminal of the capacitor 403 and a gate terminal of the switching element 405. When the gate voltage of the switching element 405 gets higher than the DC voltage of the capacitor 403 through the starting resistance 406, drain current flows, and the current is fed to the primary winding Np. As a result, the transformer 419 is excited, and voltage is induced to the other primary or auxiliary winding Nb. The gate voltage of the switching element 405 increases, and the switching element 405 has an ON state.

On the other hand, the auxiliary winding Nb is also fed to a time constant circuit including the resistance 416 and capacitor 415 and is connected such that the voltage across the capacitor 415 may also be applied to between the base and emitter of the transistor 409.

When the voltage of the capacitor 415 increases and the transistor 409 is turned on, the gate voltage of the switching element 405 decreases, and the switching element 405 is turned off.

When the switching element 405 is turned off, the terminal voltage of a secondary winding Ns on the secondary side of the transformer 419 inverts, and current flows out from the secondary winding Ns through a secondary rectifier diode 417. The current is charged to a capacitor 418. The energy stored in the transformer 419 is charged to the capacitor 418 under the limitation with the inductance of the secondary winding Ns. The drain voltage of the switching element 405 while the switching element 405 is having an OFF state is equal to the sum value of the voltage resulting from the multiplication of the voltage of the secondary side by the ratio of the number of turns of the primary winding Np and the number of turns of the secondary winding Ns and the voltage charged in the capacitor 403. When the current of the secondary winding Ns is equal to 0, the voltage generated on the drain side of the switching element 405 starts vibrating about the voltage charged to the capacitor 403 for a period depending on the inductance of the transformer 419 and the capacitor 404.

The voltage of the primary winding Np is reflected on the auxiliary winding Nb. When the drain terminal voltage gets lower than the voltage across the capacitor 403, voltage is applied to the auxiliary winding Nb such that the gate terminal voltage of the switching element 405 may be higher than the source terminal. When the gate terminal voltage exceeds the gate threshold voltage of the switching element 405, the switching element 405 is turned on again. After this point, the operations as described above are repeated.

When the voltage across the capacitor 418 increases, the partial pressure of the resistances 421 and 422 operates a shunt regulator 420, and current is fed to a photo-coupler PC 401. The photo-coupler PC 401 lights up, and the impedance of the phototransistor of the photo-coupler PC 401 decreases. As a result, the voltage of the capacitor 415 of the time constant circuit increases earlier than that charged by the resistance 416, and the transistor 409 is turned on. Thus, the switching element 405 is turned off. This feedback operation allows the switching power supply to output a constant voltage.

Recently, the reduction of power consumption while various electronic apparatuses have standby states has been demanded. An electronic apparatus having the aforementioned self-excited flyback switching power supply has a mode for normal operations (hereinafter, also called a normal mode) and also a power saving mode for standby states (also called a power saving mode). In the power saving mode, the output voltage of the power supply is reduced, and the power consumption at the standby states is reduced.

FIG. 6 illustrates a circuit diagram of a switching power supply in the past. FIG. 7 illustrates waveforms when the output voltage is reduced in the power saving mode in a self-excited flyback power supply. In addition to the self-excited flyback power supply in FIG. 5, the switching power supply in FIG. 6 further includes an output variable circuit having a resistance 421 (resistance value Ra), a resistance 422 (resistance value Rb), a resistance 423 (resistance value Rc), a resistance 424, and a switching element 425. The output variable circuit receives from a central processing unit (CPU) 1, which is a control unit of the electronic apparatus, a power save signal (hereinafter, called a /PSAVE signal) which instructs the shift to the power saving mode. The CPU 1 uses the /PSAVE signal to shift the electronic apparatus from the mode for normal operations to the power saving mode. In order to set the electronic apparatus to the normal mode, the CPU 1 changes the /PSAVE signal to a High level (hereinafter, called an H level). In order to set it to the power saving mode, the CPU 1 changes the /PSAVE signal to a Low level (hereinafter, called an L level). The /PSAVE signal is supplied to the switching element 425. In the normal mode, that is, when the /PSAVE signal has the H level, the switching element 425 is turned on, and the resistance 422 (Rb) and resistance 423 (Rc) are connected in parallel. The voltage resulting from the division of the output voltage by the parallel resistance (Rb//Rc) of the resistance 421 (Ra), resistance 422 and resistance 423 is supplied to the ref terminal of the shunt regulator 420. When the reference voltage of the shunt regulator is Vref, the output voltage Vout-h in the normal mode is substantially expressed by the following expression.

$$V_{out-h} \cong \frac{R_a + (R_b // R_c)}{(R_b // R_c)} \cdot V_{ref} \quad (1)$$

In this case, (Rb//Rc) is a parallel resistance value of Rb and Rc and may be expressed by the following expression.

$$R_b // R_c = \frac{R_b \cdot R_c}{R_b + R_c} \quad (2)$$

On the other hand, in the power saving mode, that is, when the /PSAVE signal has the L level, the switching element 425 is turned off, and the resistance 423 (Rc) is isolated. Thus, the voltage resulting from the division of the output voltage by the resistance 421 (Ra) and resistance 422

(Rb) is supplied to the ref terminal of the shunt regulator 420. The output voltage Vout-l in the power saving mode may substantially be expressed by the following expression.

$$V_{out-l} \cong \frac{R_a + R_b}{R_b} \cdot V_{ref} \quad (3)$$

This expression describes that the output voltage Vout-l in the power saving mode is lower than the output voltage Vout-h in the normal mode. When the switching element 405 has the off state, the voltage Vnnl induced in the auxiliary winding Nb is reduced, as substantially expressed by the following expression.

$$V_{nnl} \cong (V_{out-l} + V_f) \cdot \frac{N_b}{N_s} \quad (4)$$

As described above, in the power saving mode, the output voltage Vnnl decreases and keeps a relatively low voltage value and has a small amplitude. Thus, the gate voltage of the switching element 405 is lower than the threshold value. This may prevent the switching element 405 from being turned on by the flyback voltage Vnnh. As the path for increasing the gate voltage of the switching element 405 in the power saving mode, the gate voltage is increased through the starting resistance, and the switching element 405 is turned on. When the turning on of the switching element 405 delays and the OFF period of the switching element 405 extends, the oscillating frequency decreases. In this way, reducing the oscillating frequency and reducing the output voltage may improve the circuit efficiency and may reduce the power consumption at the standby states. Japanese Patent Laid-Open No. 2000-278946 discloses the operations at a standby state.

Attempting to reduce the output voltage for power saving in the power saving mode in the configuration in FIG. 6 may limit the voltage reduction as will be described below.

In FIG. 6, the starting resistance 406 has a resistance value R1, and the capacitor 410 has a capacitance C. DC voltage V1 is charged to the smoothing capacitor 403 and is generated across it. In a self-excited flyback power supply which reduces the output voltage in the power saving mode, the output voltage Vout-l decreases, and the drain-source voltage generated when the switching element 405 has the OFF state decreases in the same manner as in the example in the past. This reduces the voltage Vnnl induced in the auxiliary winding Nb of the transformer, and the amplitude of the voltage in the ringing period t2-t3 of the gate-source voltage Vgs of the switching element 405 becomes equal to or lower than the threshold voltage of the switching element 405. Therefore, the only path for turning on the switching element 405 is the increase of the gate voltage through the starting resistance of the resistance 406.

The gradient (in the period t4-t5) of the increase of the gate voltage of the switching element 405 depends on the starting resistance 406 (resistance value R1) and the capacitance C of the capacitor 410 and may be substantially expressed by the following expression.

$$V_{gs} \cong \cdot \frac{V_1}{R_1 \cdot C} \cdot T \quad (5)$$

In order to reduce the power at the standby states in the power saving mode, the starting resistance 406 operates to increase the operational efficiency of the circuit. This causes the gate voltage of the switching element 405 to increase with a mild gradient. The gate voltage of the switching element 405 increases through the starting resistance 406, and the drain current flows from the primary winding Np. Voltage is induced in the auxiliary winding Nb, and the gate voltage is increased. During this (period t4-t5), the switching loss increases. In the self-excited flyback power supply, the switching loss (increase of the time for turning on) for turning on the switching element 405 in the power saving mode may limit the amount of power reduction at standby states. In other words, further power reduction becomes difficult in the power saving mode.

SUMMARY OF THE INVENTION

The present invention was made in view of the above-described problem and provides a self-excited flyback power supply which reduces the output voltage in a power saving mode and allows further reduction of power consumption by reducing the switching loss when a switching element is turned on.

A switching power supply apparatus according to an aspect of the present invention includes a first switching unit which switches a primary winding of a transformer, a transmitting unit which transmits output from a secondary winding of the transformer to a primary side of the transformer, a voltage holding unit which holds voltage generated in an auxiliary winding of the transformer, and a voltage detecting unit which detects voltage applied to the first switching unit. In this case, when the first switching unit operates such that voltage generated in a secondary winding of the transformer may be low, voltage is supplied from the voltage holding unit to the first switching unit in accordance with the voltage detected by the voltage detecting unit to thus turn on the first switching unit.

An image forming apparatus according to another aspect of the present invention includes an image forming unit which forms an image, a control unit which controls an operation by the image forming unit, a first switching unit which switches a primary winding of a transformer, a transmitting unit which transmits output from a secondary winding of the transformer to a primary side of the transformer, and a switching power supply which supplies power to the control unit by controlling an operation by the switching unit based on the output of the transmitting unit. In this case, the switching power supply has a voltage holding unit which holds voltage generated in an auxiliary winding of the transformer, and a voltage detecting unit which detects voltage applied to the first switching unit. When the first switching unit operates such that voltage generated in a secondary winding of the transformer may be low, voltage is supplied from the voltage holding unit to the first switching unit in accordance with the voltage detected by the voltage detecting unit to thus turn on the first switching unit.

Further features of the present invention will become apparent from the following description of exemplary embodiments with reference to the attached drawings.

DESCRIPTION OF THE EMBODIMENTS

The configuration and operations of the present invention will be described below. The following embodiments will be given for illustration purpose, and It is not intended that the technical scope of the present invention is only limited thereto. Modes for embodying the present invention will be described with reference to embodiments and attached drawings.

A first embodiment will be described.

Figure 1:
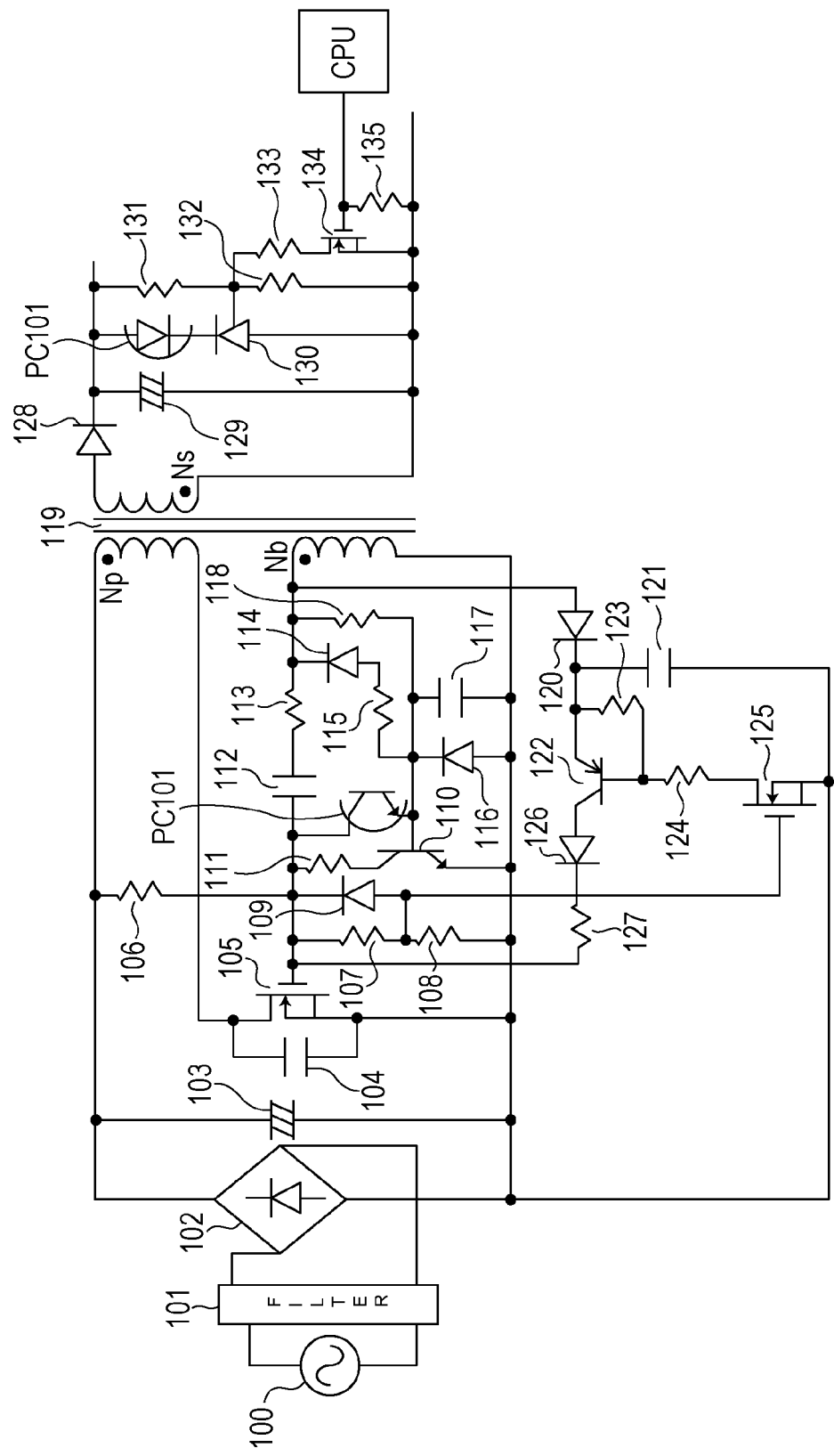
FIG. 1 is a circuit diagram of a switching power supply of a first embodiment.

FIG. 1 illustrates a circuit of a self-excited flyback switching power supply according to the first embodiment. The fundamental configuration is common to that of the aforementioned circuit of the switching power supply in the past. Referring to FIG. 1, the circuit includes a commercial AC power supply 100, a filter circuit 101, a rectifier diode bridge 102, a primary electrolytic capacitor 103, a capacitor 104, and a transformer 119. The transformer 119 has a primary winding Np, a secondary winding Ns, and an auxiliary winding (also called a feedback winding) Nb. The circuit further includes a starting resistance 106 with a resistance value R1 and a first switching element 105. The circuit further includes a rectifier diode 128 and an electrolytic capacitor 129 on the secondary side. The rectifier diode 128 and electrolytic capacitor 129 are included in a rectifying/smoothing circuit. A photo-coupler 101 (PC 101 in FIG. 1) transmits the output of the secondary side to the primary side. The secondary side has an output-voltage changing circuit including a resistance 131 with a resistance value Ra, a resistance 132 with a resistance value Rb, a resistance 133 with a resistance value Rc, a resistance 135, and a switching element 134. A shunt regulator 130 and the output-voltage changing circuit are included in error detecting circuit.

The first embodiment is different from the circuit of the switching power supply in the past in that it includes additional circuits including:

(a) a circuit as a voltage detecting unit, (b) a circuit as a voltage holding unit which holds voltage from the auxiliary winding Nb, and (c) a circuit as a control unit which applies voltage to a base of the switching element 105 in accordance with the voltage detected by the voltage detecting unit.

The circuit configuration and circuit operations including those additional circuits of the first embodiment will be described below.

A diode 120 as a rectifier element is a circuit functioning as a power supply unit having its anode connected to the auxiliary winding Nb of the transformer 119 and its cathode connected to a capacitor 121 as a capacitive element. A resistance 107 and a resistance 108 are connected in parallel with the first switching element 105. The connection point of the resistance 107 and resistance 108 and the gate of a second switching element 125 are connected to form a circuit as a voltage detecting unit which detects the gate-source voltage of the first switching element 105 and compares it with the threshold voltage of the second switching element 125. A diode 109 is connected between the starting resistance 106 and the second switching element 125.

The second switching element 125 has a drain connected to the resistance 124. The other end of the resistance 124 is connected to a base of the third switching element 122 and the resistance 123. An emitter of the third switching element 122 and the other end of the resistance 123 are connected to the capacitor 121 which is a circuit as a power supply unit. The third switching element 122 has a collector connected to the anode of the diode 126. The cathode of the diode 126 is connected to the resistance 127. The other end of the resistance 127 is connected to a gate of the first switching element 105. The circuit including the second switching element 124, resistance 124, third switching element 122, resistance 123, diode 126 and resistance 127 is a circuit as a control unit.

According to the first embodiment, MOSFETs (Metal-Oxide Semiconductor Field-Effect Transistors) are used for the first switching element 105 and second switching element 125, and a PNP transistor is used for the third switching element 122. The elements applied in this embodiment are given for illustration purpose only, and elements may be properly selected for use in accordance with the circuit configuration, output voltage value and precision.

When AC voltage is applied from the commercial AC power supply 100 through the filter circuit 101 to the rectifier diode 102, the AC voltage undergoes full-wave rectification in the rectifier diode 102 and is peak charged to the primary electrolytic capacitor 103. This generates DC voltage V1 across the primary electrolytic capacitor 103. The DC voltage V1 across the primary electrolytic capacitor 103 is divided by the starting resistance 106 (resistance value R1), resistance 107, and resistance 108. The voltage divided by the resistances 107 and 108 is also applied to between the gate and source of the first switching element 105. If the applied voltage increases, the drain current of the first switching element 105 flows, and current is fed to the primary winding Np. As a result, the transformer 119 is excited, and voltage is induced in the auxiliary winding Nb. The gate voltage of the first switching element 105 increases, and the first switching element 105 is turned on.

Low voltage is generated at a terminal connected to the anode side of the diode 128 of the secondary winding Ns of the transformer, while high voltage is generated at the opposite terminal of the secondary winding Ns. This diode 121 is reverse-biased, and current substantially being equivalent to leak current only flows. On the other hand, the auxiliary winding Nb also supplies voltage to a time constant circuit including the resistance 118 and capacitor 117. When voltage across the capacitor 117 increases and the transistor 110 is turned on, the gate voltage of the first switching element 105 decreases, and the first switching element 105 is turned off. Intermittently turning on and off the current to be fed to the primary winding Np through the series of operations (also called a switching operation) may generate voltage in the secondary winding Ns.

The diode 120 and capacitor 121 functioning as a power supply unit is excited by the feed of current to the primary winding Np when the DC voltage V1 turns on the first switching element 105. When voltage is induced in the auxiliary winding Nb, the voltage is peak charged to the capacitor 121 through the diode 120.

A threshold voltage Vth2 of the second switching element 125 is lower than a threshold voltage value Vth1 of the first switching element 105, and a relationship Vth1>Vth2 is provided. If the control unit detects Vth2 of the second switching element 125 which is equal to or lower than the threshold value of the first switching element 105 by using the voltage detecting unit (detected voltage at the connection point between the resistances 107 and 108), drain current flows from the capacitor 121 of the power supply unit through the resistance 124 and 123 when the second switching element 125 is turned on. This generates a potential difference between the emitter and base of the third switching element 122, and the third switching element 122 is turned on. If the third switching element 122 is turned on, the charges stored to the capacitor 121 of the power supply unit through the diode 126 are supplied to the gate of the first switching element 105. This increases the gate voltage of the first switching element 105.

The circuit operations by the voltage detecting unit and control unit have been described up to this point.

Figure 2:
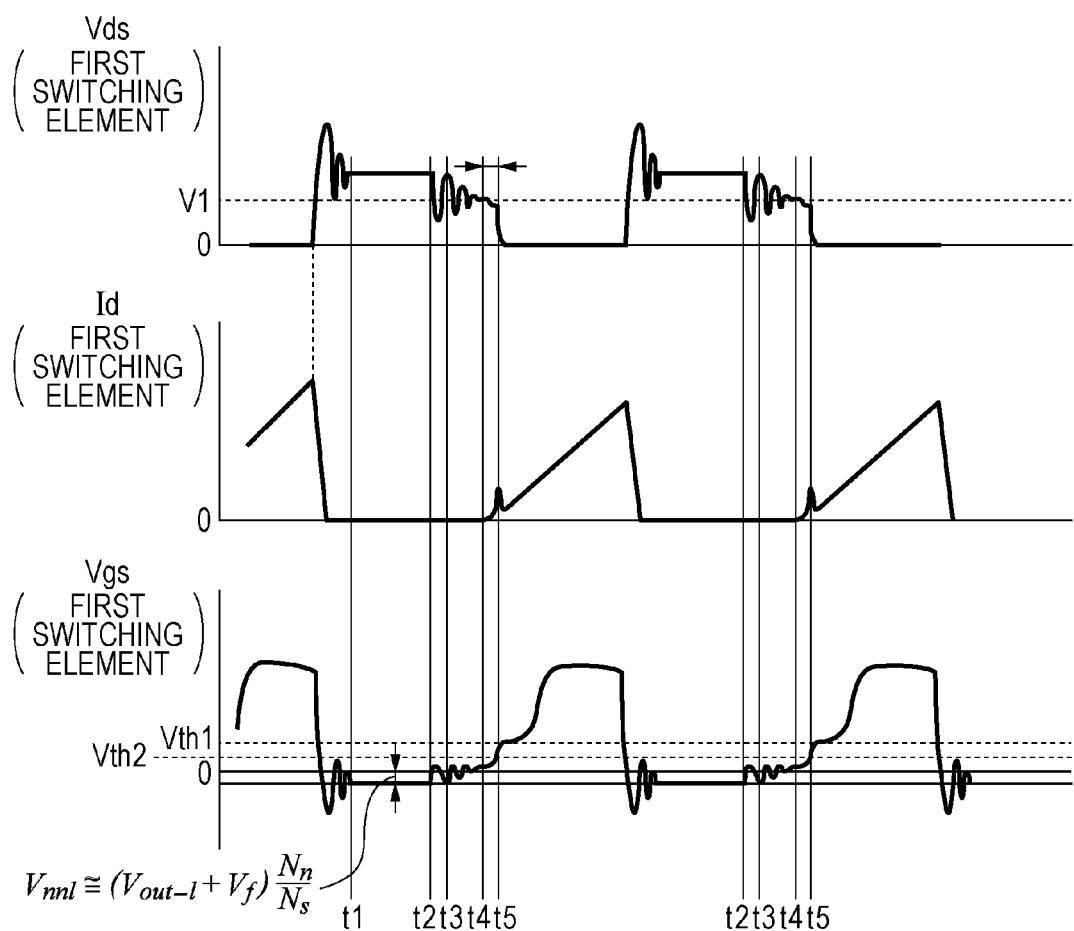
FIG. 2 is a waveform diagram in a power saving mode of the switching power supply of the first embodiment.
Figure 3:
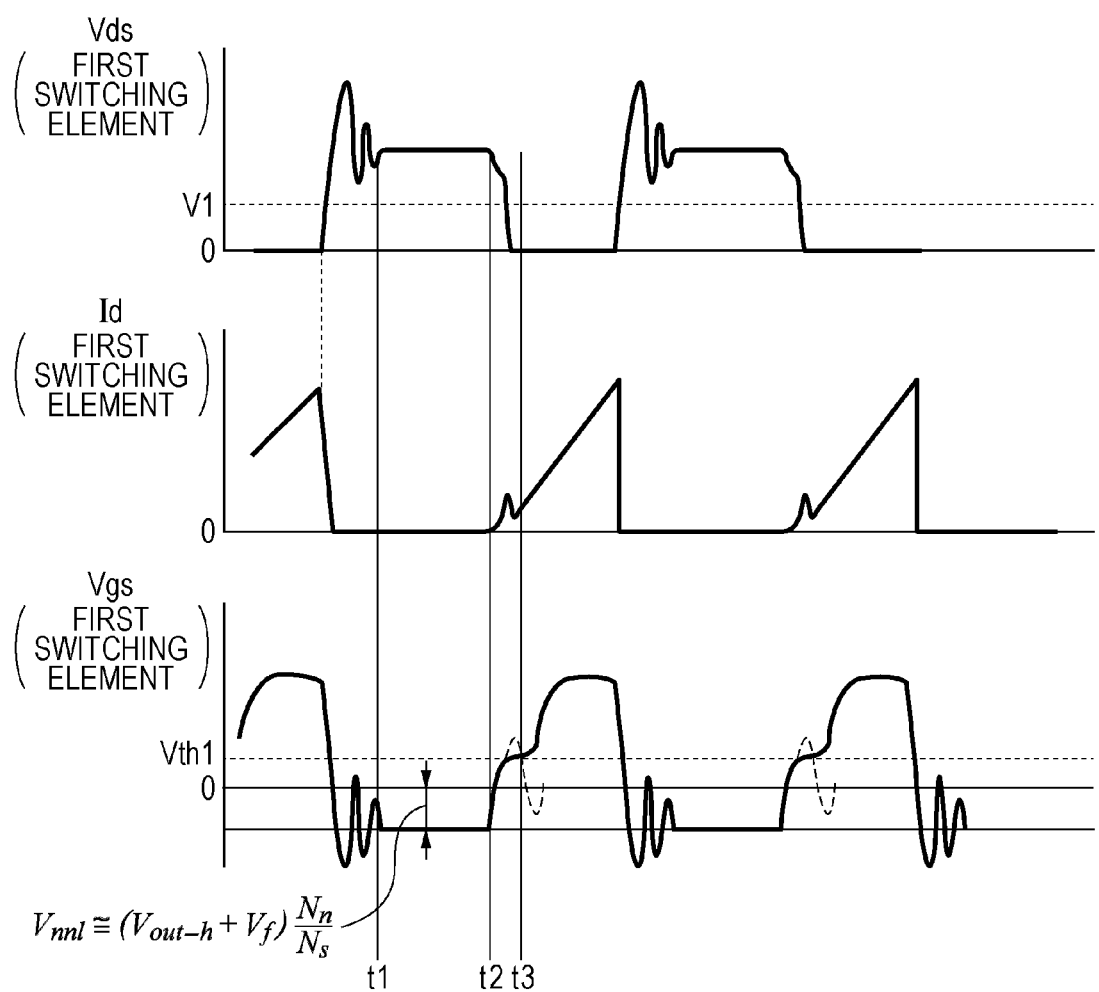
FIG. 3 is a waveform diagram in a normal mode of the switching power supply of the first embodiment.

FIG. 2 illustrates waveforms when power is saved (hereinafter called a power saving mode). FIG. 3 illustrates waveforms when a normal operation is being performed (hereinafter, called a normal mode). The output variable circuit receives a power save signal (called a /PSAVE) from a CPU which is a control unit of an electronic apparatus. The CPU uses the /PSAVE signal to shift the electronic apparatus from the normal mode to the power saving mode. In order to set the electronic apparatus to the normal mode, the CPU supplies the /PSAVE signal to the switching element 134. If the /PSAVE signal has a High level (hereinafter, called an H level), the switching element 134 is turned on, and the resistance 132 (resistance value Rb) and resistance 133 (resistance value Rc) are connected in parallel. The voltage resulting from the division of the output voltage by the resistance 131 (resistance value Ra) and the parallel resistances 132 and 133 (Rb//Rc) is supplied to a ref terminal of the shunt regulator 130. Thus, when the reference voltage (reference value) of the shunt regulator is Vref, the output voltage Vout-h in the normal mode is substantially expressed by the following expression.

$$V_{out-h} \cong \frac{R_a + (R_b // R_c)}{(R_b // R_c)} \cdot V_{ref} \quad (1)$$

In the expression, (Rb//Rc) is a parallel resistance value of Rb and Rc and is expressed by the following expression.

$$R_b // R_c = \frac{R_b \cdot R_c}{R_b + R_c} \quad (2)$$

On the other hand, in the power saving mode, that is when the /PSAVE signal has an L level, the switching element 134 is turned off, and the resistance 133 (resistance value Rc) is isolated. Thus, the voltage to be supplied to the ref terminal of the shunt regulator 130 is the result of the division of the output voltage by the resistance 131 (resistance value Ra) and resistance 132 (resistance value Rb). Therefore, the output voltage Vout-l in the power saving mode is substantially expressed by the following expression.

$$V_{out-l} \cong \frac{R_a + R_b}{R_b} \cdot V_{ref} \quad (3)$$

In other words, the output voltage Vout-l in the power saving mode is lower than the output voltage Vout-h in the normal mode. Furthermore, when the first switching element 105 has an off state, the voltage Vnnl induced in the auxiliary winding Nb is substantially expressed by the following expression.

$$V_{nnl} \cong (V_{out-l} + V_f) \cdot \frac{N_b}{N_s} \quad (4)$$

The decrease of the voltage Vnnl induced in the auxiliary winding Nb in a t1-t2 period expressed by Expression (4) also reduces the voltage amplitude value by ringing in a t2-t3 period. The amplitude value of the ringing is lower than the threshold value Vth1 of the first switching element 105, and the value detected by the voltage detecting unit (connection point between the resistances 107 and 108) is lower than the threshold value Vth2 of the second switching element 125. As the path for the increasing the gate voltage of the first switching element 105, the gate voltage of the first switching element 105 is increased from the DC voltage V1 through R1 of the starting resistance 106. The gradient of the increase of the gate-source voltage of the first switching element 105 depends on R1 of the starting resistance 106 and the capacitance C of the capacitor 112 and is substantially expressed by the following expression.

$$V_{gs} \cong \cdot \frac{V_1}{R_1 \cdot C} \cdot T \quad (5)$$

The gate-source voltage of the first switching element 105 is lower than the threshold value Vth1 of the first switching element 105 in the voltage detecting unit and is compared to determine whether it is equal to or higher than Vth2 of the second switching element 125.

Figure 7:
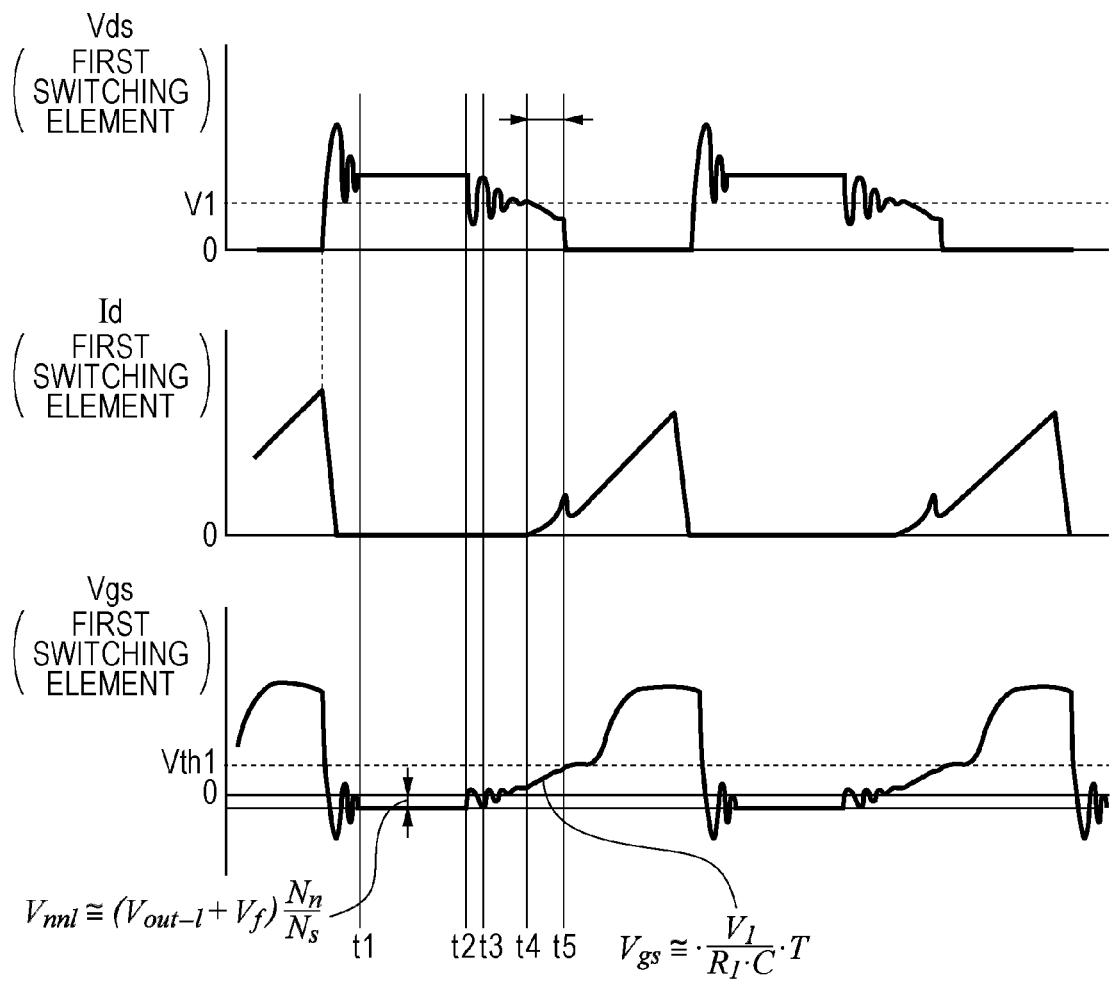
FIG. 7 is a waveform diagram in a power saving mode of a switching power supply in the past.

If the voltage detecting unit detects that it is equal to or higher than Vth2 of the second switching element 125, the second switching element 125 is turned on. Voltage is applied from the power supply unit (diode 120 and capacitor 121) to the gate of the first switching element 105 through the third switching element 122 and diode 126. This rapidly raises the gate-source voltage. In other words, in a t4-t5 period when the first switching element 105 has an ON state, the drain-source voltage rapidly rises, which may reduce the loss when it is turned on. The loss reduction may be understood also from the fact that the t4-t5 period of the first embodiment is shorter than the t4-t5 period in the aforementioned switching power supply in the past in FIG. 7.

In this way, in a power saving mode of an electronic apparatus, the switching loss caused when the first switching element 105 is turned on may be reduced even though the output voltage of a self-excited flyback switching power supply is reduced. This further allows reduction of power consumption in the power saving mode.

Figure 4:
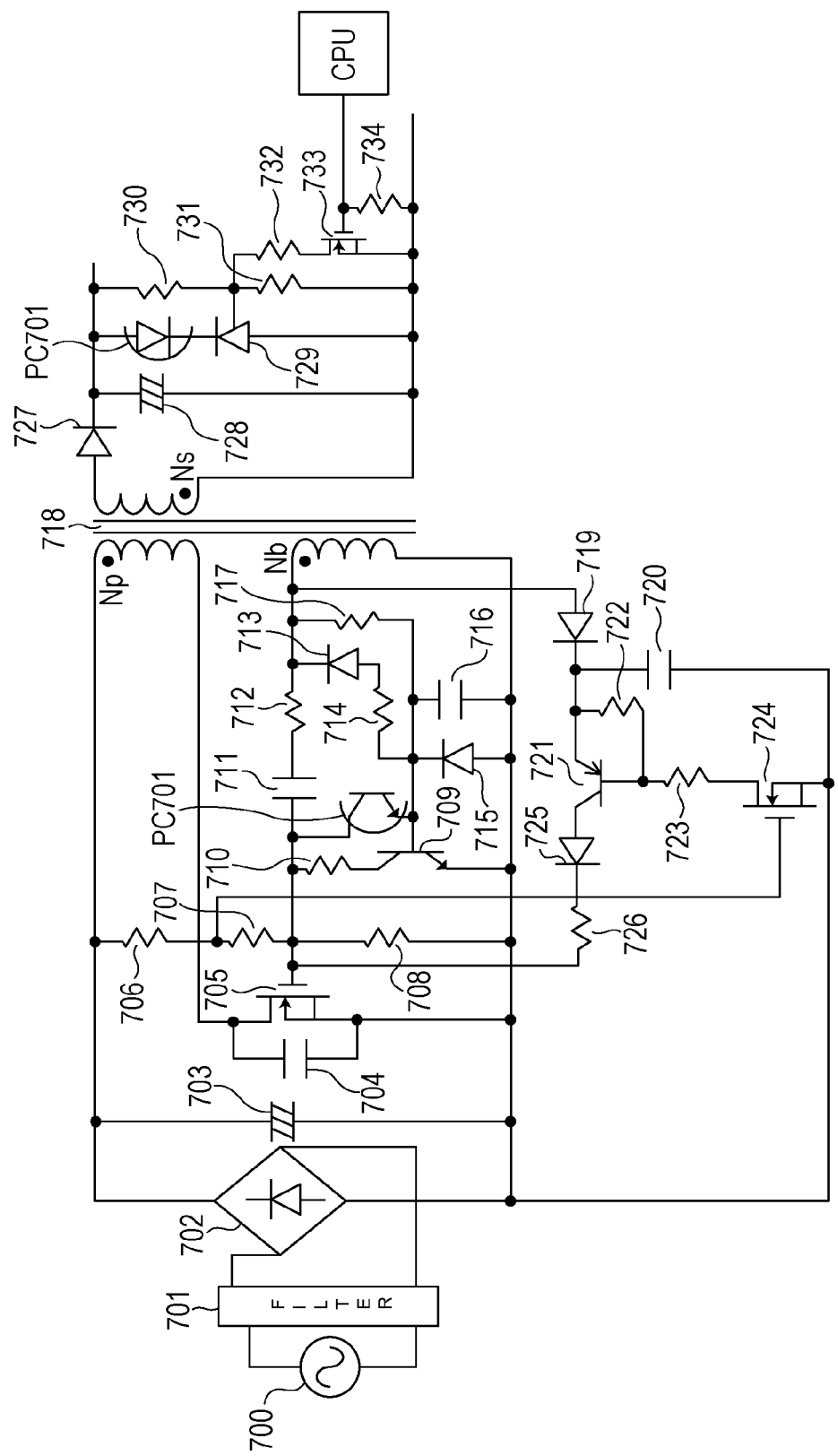
FIG. 4 is a circuit diagram of a switching power supply of a second embodiment.
Figure 5:
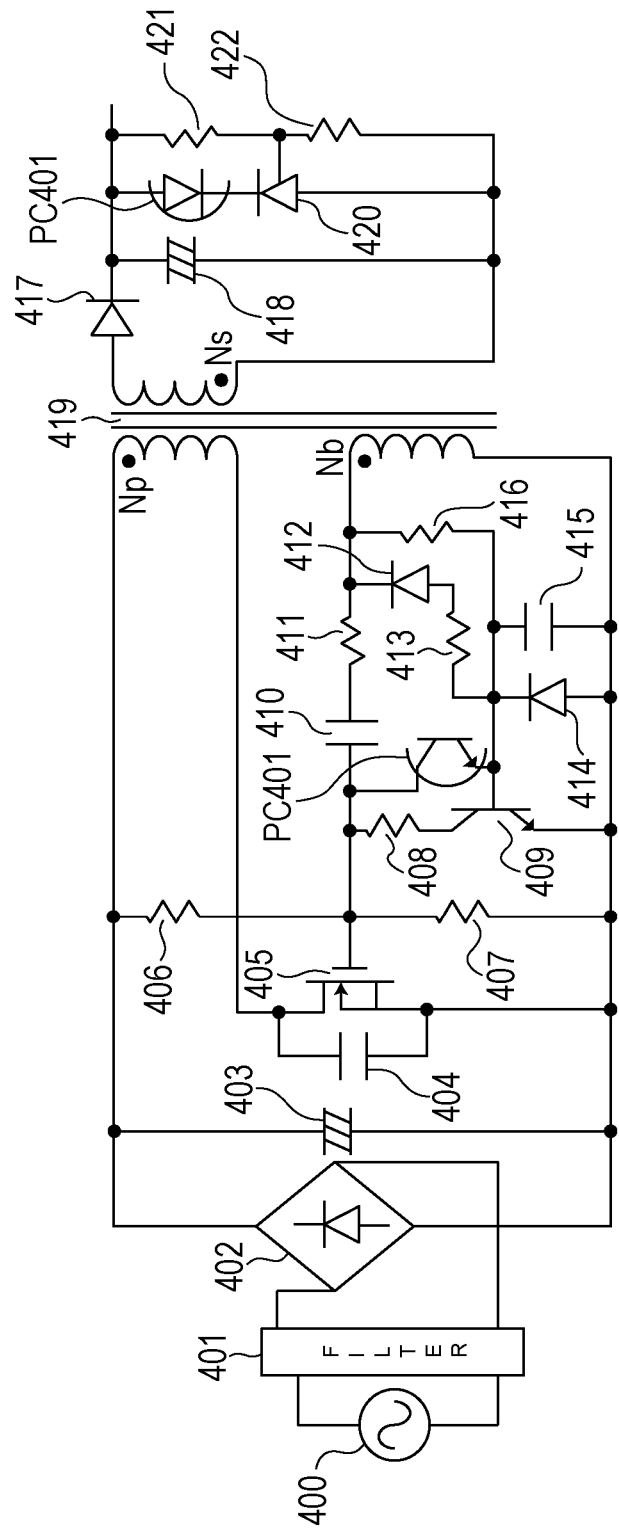
FIG. 5 is a circuit diagram of a switching power supply in the past.
Figure 6:
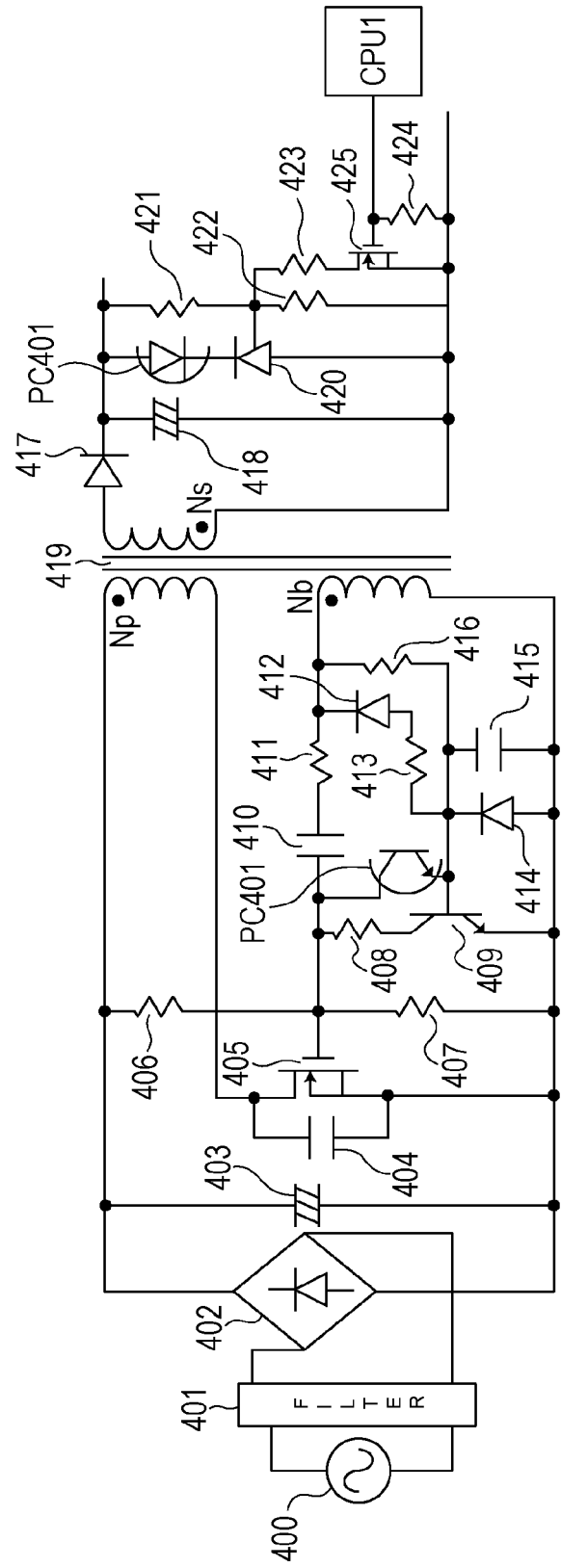
FIG. 6 is a circuit diagram of a switching power supply in the past.

Next, the configuration of a second embodiment will be described with reference to FIG. 4. The description on the same circuit configuration as that of the first embodiment will be omitted. Referring to FIG. 4, a resistance 706 (resistance value R706) is connected to an electrolytic capacitor 703, and the other end of the resistance 706 is connected to a resistance 707 (resistance value R707). The other end of the resistance 707 is connected to a resistance 708 (resistance value R708) and a gate of the first switching element 705. The other end of the resistance 708 is connected to a source of the first switching element 705. The connection point between the two resistance 706 and resistance 707 and a gate of a second switching element 724 are connected. A voltage detecting unit is provided which detects the gate-source voltage of the first switching element 705 from the resistance 706 and the partial pressure resistance of the resistance 707 and resistance 708 and compares it with a threshold voltage of the second switching element 724. This circuit configuration is different from the first embodiment.

A circuit functioning as a control unit is provided. In the circuit, the drain of the second switching element 724 is connected to the resistance 723, and the other end of the resistance 723 is connected to a base of the third switching element 721 and the resistance 722. An emitter of the third switching element 721 and the other end of the resistance 722 are connected to a capacitor 720 which is a power supply unit. A collector of the third switching element 721 is connected to an anode of a diode 725, and a cathode of the diode 725 is connected to a resistance 726. The other end of the resistance 726 is connected to a gate of the first switching element 705.

The relationship of voltage to be divided by the resistances of the voltage detecting unit is substantially expressed by the following expression.

$$\frac{R_{708}}{R_{706}+R_{707}+R_{708}} \cdot V_1 \leq \frac{R_{707}+R_{708}}{R_{706}+R_{707}+R_{708}} \cdot V_1 \quad (6)$$

The relationship between a threshold voltage Vth1 of the first switching element 705, a threshold voltage Vth2 of the second switching element 724, and the voltage to be divided by the resistances of the voltage detecting unit may only require that the voltage is higher than the threshold voltage Vth2 of the second switching element 724 before the first switching element 705 is turned on.

If the voltage detecting unit detects the threshold voltage Vth2 of the second switching element 724, the second switching element 724 is turned on. When the second switching element 724 is turned on, the drain current of the second switching element 724 flows through the resistances 722 and 723. This generates a potential difference between the emitter and base of the third switching element 721, and the third switching element 721 is turned on. If the third switching element 721 is turned on, the charges stored in the capacitor 720 which is a power supply unit through the diode 725 is fed to the gate of the first switching element 705. This may increase the gate voltage of the first switching element 705.

This rapidly raises the gate-source voltage. In other words, drain-source voltage rapidly rises in a turn-on period of the first switching element 705, which can reduce the loss when the first switching element 705 is turned on.

Like the first embodiment, in the power saving mode of the electronic apparatus, the switching loss when the first switching element 705 is turned on may be reduced even though the output voltage of the self-excited flyback switching power supply is reduced. This further allows reduction of power consumption in the power saving mode.

[Application Examples of Switching Power Supply]

The self-excited flyback switching power supply apparatuses according to the first and second embodiments may be applied as a low-voltage power supply in an image forming apparatus such as a laser beam printer, a copy machine, and a facsimile. The application examples will be described below. The switching power supply apparatus is applicable as a power supply to a controller which is a control unit in an image forming apparatus or as a power supply apparatus which supplies power to a motor functioning as a driving unit of a conveyance roller which conveys paper.

Figure 8A:
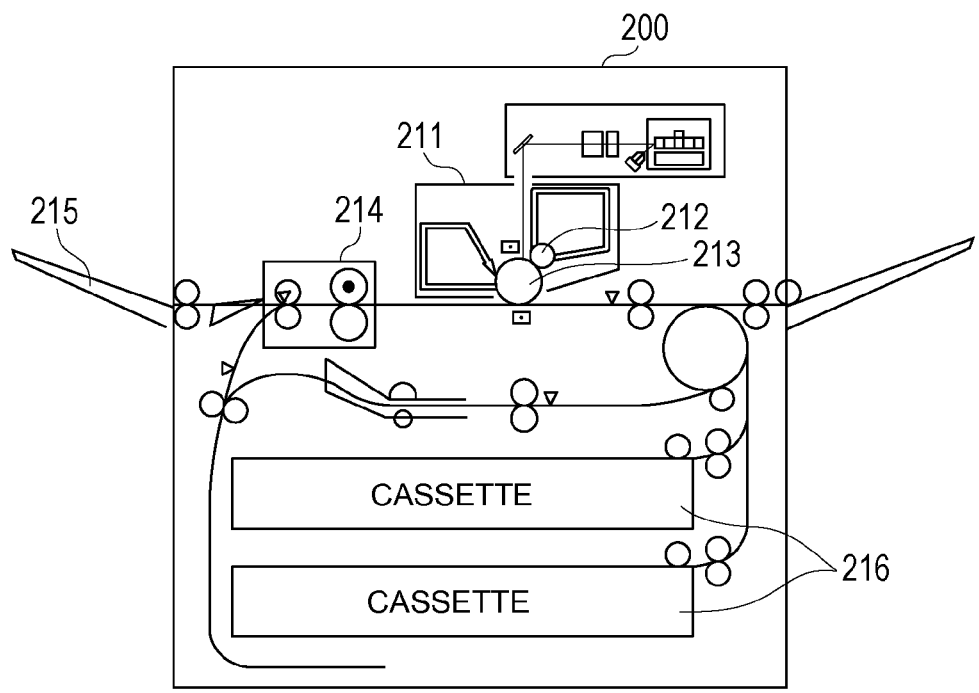
FIGS. 8A and 8B illustrate application examples of a switching power supply.

FIG. 8A illustrates a schematic configuration of a laser beam printer which is an example of the image forming apparatus. A laser beam printer 200 includes, as the image forming unit 210, a photoconductor drum 211 functioning as an image carrier in which a latent image is formed and a developing unit 212 which develops with toner the latent image formed on the photoconductor drum. The toner image developed in the photoconductor drum 211 is transferred to paper (not illustrated) functioning as a recording medium supplied from a cassette 216. The toner image transferred to the paper is fused by a fuser 214 and is ejected to a tray 215.

Figure 8B:
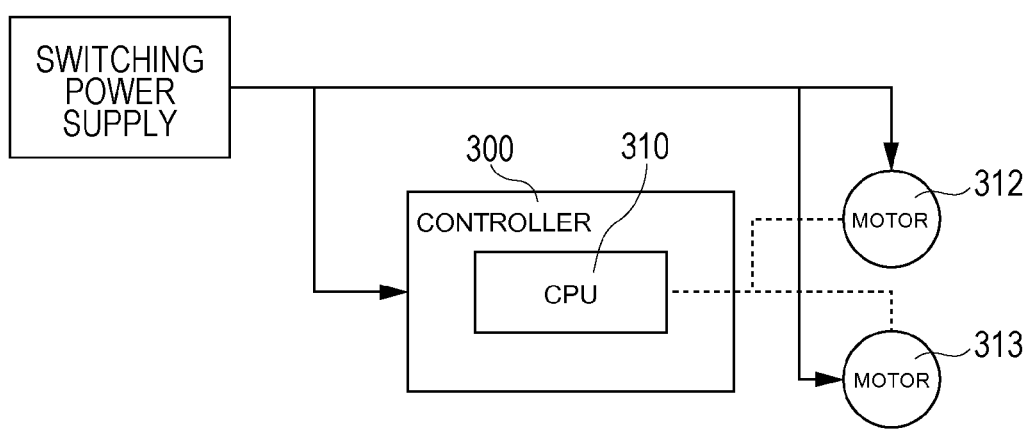

FIG. 8B illustrates a power supply line from the power supply to a controller functioning as the control unit of the image forming apparatus and a motor of the driving unit. The aforementioned current resonant power supply is applicable as the power supply of a controller 300 having a CPU 310 which controls the image forming operation or as a low-voltage power supply which supplies power to motors 312 and 313 functioning as the driving unit for forming an image. The power of 3.3 V and 24 V are supplied to the controller 300 and the motors, respectively. For example, the motor 312 may be a motor which drives a conveyance roller which conveys paper, and the motor 313 may be a motor which drives the fuser 214. In the application to an image forming apparatus such as a laser beam printer, performing the operations as described above as the switching power supply in the power saving mode of the image forming apparatus may further allow reduction of power consumption of the switching power supply. This allows reduction of power consumption in the power saving mode as the whole apparatus. The switching power supply is also applicable as a low-voltage power supply of other electronic apparatuses, without limiting to the image forming apparatuses described herein.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-271694 filed Dec. 6, 2010, which is hereby incorporated by reference herein in its entirety.

What is claimed is:

1. A switching power supply apparatus being used for an image forming apparatus, the switching power supply apparatus comprising:
    a transformer including a primary winding, a secondary winding, and an auxiliary winding;
    a first switching element which is connected to the primary winding;
    a transmitting unit which transmits a signal corresponding to a voltage generated in the secondary winding of the transformer to a primary side of the transformer;
    a driving unit which is connected to the auxiliary winding, and drives the first switching element at a predetermined frequency according to the signal transmitted by the transmitting unit so as to generate a first voltage in the secondary winding, or drives the first switching element at a frequency lower than the predetermined frequency according to the signal transmitted by the transmitting unit so as to generate a second voltage lower than the first voltage in the secondary winding, a state where the first voltage is generated in the secondary winding being a normal operation state of the switching power supply apparatus and a state where the second voltage is generated in the secondary winding being a power saving state of the switching power supply apparatus;
    a voltage holding unit which is connected to the auxiliary winding, and holds a voltage generated in the auxiliary winding; and
    a voltage detecting unit which detects voltage applied to the first switching element; and
    a second switching element which is connected to the voltage holding unit, and is turned on in a case of the voltage detected by the voltage detecting unit being equal to or more than a threshold voltage of the second switching element, wherein the second switching element continues to be turned off in the normal operation state, wherein the second switching element continues to be turned on in the power saving state, and wherein the voltage held by the voltage holding unit is supplied to the first switching element in response to a turn-on of the second switching element in the power saving state without depending upon the signal from the transmitting unit.

2. The switching power supply apparatus according to claim 1, wherein the voltage holding unit has a rectifier element which rectifies voltage from the auxiliary winding and a capacitor which holds the rectified voltage; and when the first switching element is turned on, voltage from the auxiliary winding is rectified in the rectifier element and is held in the capacitor.

3. The switching power supply apparatus according to claim 1, wherein the voltage detecting unit has two resistors connected in series between a gate and a source of the first switching element, and wherein the second switching element is connected between the two resistors.

4. The switching power supply apparatus according to claim 1, further comprising a third switching element which is turned on when the second switching element is turned on, wherein the voltage held by the voltage holding unit is supplied to the first switching element when the third switching element is turned on.

5. The switching power supply apparatus according to claim 1, further comprising:

a voltage output unit which rectifies and smoothes the voltage generated in the secondary winding;

a comparing unit which compares the output from the voltage output unit with a reference value; and a changing unit which changes the reference value of the comparing unit, wherein the changing unit changes the reference value when the switching power supply apparatus is in the power saving state.

6. The switching power supply apparatus according to claim 1, wherein the second switching element is turned on when the voltage detected by the voltage detecting unit is smaller than a first threshold voltage for turning on the first switching element and equal to or more than a second threshold voltage for turning on the second switching element.

7. An image forming apparatus comprising:

an image forming unit which forms an image;

a control unit which controls an operation by the image forming unit; and a power supply which supplies power to the control unit, the power supply comprising:

a transformer including a primary winding, a secondary winding, and an auxiliary winding;

a first switching element which is connected to the primary winding;

a transmitting unit which transmits a signal corresponding to a voltage generated in the secondary winding of the transformer to a primary side of the transformer;

a driving unit which is connected to the auxiliary winding, and drives the first switching element at a predetermined frequency according to the signal transmitted by the transmitting unit so as to generate a first voltage in the secondary winding, or drives the first switching element at a frequency lower than the predetermined frequency according to the signal transmitted by the transmitting unit so as to generate a second voltage lower than the first voltage in the secondary winding, a state where the first voltage is generated in the secondary winding being a normal operation state of the image forming apparatus and a state where the second voltage is generated in the secondary winding being a power saving state of the image forming apparatus;

a voltage holding unit which is connected to the auxiliary winding, and holds a voltage generated in the auxiliary winding;

a voltage detecting unit which detects voltage applied to the first switching element; and a second switching element which is connected to the voltage holding unit, and is turned on in a case of the voltage detected by the voltage detecting unit being equal to or more than a threshold voltage of the second switching element, wherein the second switching element continues to be turned off in the normal operation state, wherein the second switching element continues to be turned on in the power saving state, and wherein the voltage held by the voltage holding unit is supplied to the first switching element in response to a turn-on of the second switching element in the power saving state without depending upon the signal from the transmitting unit.

8. The image forming apparatus according to claim 7, wherein the voltage holding unit has a rectifier element which rectifies voltage from the auxiliary winding and a capacitor which holds the rectified voltage; and when the first switching element is turned on, voltage from the auxiliary winding is rectified in the rectifier element and is held in the capacitor.

9. The image forming apparatus according to claim 7, wherein the voltage detecting unit has two resistors connected in series between a gate and a source of the first switching element, and wherein the second switching element is connected between the two resistors.

10. The image forming apparatus according to claim 7, further comprising a third switching element which is turned on when the second switching element is turned on, wherein the voltage held by the voltage holding unit is supplied to the first switching element when the third switching element is turned on.

11. The image forming apparatus according to claim 7, further comprising:

a voltage output unit which rectifies and smoothes the voltage generated in the secondary winding;

a comparing unit which compares output from the voltage output unit with a reference value; and a changing unit which changes the reference value of the comparing unit, wherein the changing unit changes the reference value when the image forming apparatus is in the power saving state.

12. The image forming apparatus according to claim 7, wherein the second switching element is turned on when the voltage detected by the voltage detecting unit is equal to or smaller than a first threshold voltage for turning on the first switching element.

* * * * *